United States Patent [19]
Van Hout et al.

[11] Patent Number: 5,280,865
[45] Date of Patent: Jan. 25, 1994

[54] FLEXIBLE MOUNTING SYSTEM FOR A VEHICLE MODULE

[75] Inventors: James E. Van Hout, Auburn Hills; Richard Megregian, Farmington Hills; Gilbert L. McCauley, Oak Park, all of Mich.

[73] Assignee: Chrysler Corporation, Highland Park, Mich.

[21] Appl. No.: 979,736

[22] Filed: Nov. 23, 1992

[51] Int. Cl.$^5$ .............................................. G12B 9/00
[52] U.S. Cl. .................................. 248/27.1; 248/906; 312/7.1
[58] Field of Search .................... 248/906, 27.1, 27.3; 312/242, 296, 328, 7.1; 455/345; 361/427, 422, 417, 419; 174/58; 220/3.9

[56] References Cited

U.S. PATENT DOCUMENTS

| | | | |
|---|---|---|---|
| 4,135,692 | 1/1979 | Ferguson | 248/228 X |
| 4,738,420 | 4/1988 | Angle | 455/345 X |
| 4,742,978 | 5/1988 | Ponticelli | 312/7.1 X |
| 4,895,326 | 1/1990 | Nimpoeno | 312/7.1 X |
| 4,911,386 | 3/1990 | Putman | 312/7.1 X |
| 5,104,071 | 4/1992 | Kowalski | 455/345 X |
| 5,106,039 | 4/1992 | Gross | 248/27.1 |
| 5,169,097 | 12/1992 | Yasukawa | 312/7.1 X |
| 5,193,768 | 3/1993 | Mita | 361/419 X |

*Primary Examiner*—J. Franklin Foss
*Attorney, Agent, or Firm*—Edward A. Craig

[57] ABSTRACT

A mounting system includes a plurality of mounting structures attached to a perimeter of the radio and having longitudinal apertures extending therethrough. The mounting system also includes a plurality of mounting brackets having a pair of hook shaped ends opposing one another in spaced apart relationship and being disposed in the longitudinal apertures. The mounting system further includes fasteners for fastening the mounting brackets to vehicle structure.

6 Claims, 1 Drawing Sheet

FLEXIBLE MOUNTING SYSTEM FOR A VEHICLE MODULE

BACKGROUND OF THE INVENTION

1. Field of the Invention

The present invention relates generally to a flexible mounting system for vehicle modules such as air conditioning and heater controls, radios, cassette players, and the like.

2. Description of the Related Art

Generally, vehicles such as automotive vehicles include a module such as a radio disposed in a cavity of an instrument or dash panel. Typically, the radio is mounted in the cavity by a mounting frame and bracket assembly. However, a specific mounting frame and bracket assembly must be constructed for radios of various sizes and types which is undesired.

Several attempts have been made to provide mounting assemblies to accommodate modules of various sizes and types. Examples of such mounting assemblies are disclosed in U.S. Pat. No. 4,738,420 to Angle et al. and U.S. Pat. No. 4,742,978 to Ponticelli. However, there is a need in the art to provide a modular, flexible mounting system for a vehicle radio or the like which allows a choice of where to place mounting brackets.

SUMMARY OF THE INVENTION

It is, therefore, one object of the present invention to provide a flexible mounting system for vehicle modules.

It is another object of the present invention to provide a modular mounting system.

It is yet another object of the present invention to provide a flexible module mounting system which provides a plurality of choices of where to place the mounting brackets.

To achieve the foregoing objects, the present invention is a mounting system for mounting a vehicle module. The mounting system includes at least one mounting structure attached to a perimeter of the module and having a longitudinal aperture extending therethrough. The mounting system also includes at least one mounting bracket having a pair of hook shaped ends opposing one another in spaced apart relationship. The ends extend into the longitudinal aperture. The mounting system further includes means for fastening the mounting bracket to vehicle structure.

One advantage of the present invention is that a modular, flexible mounting system is provided for mounting a vehicle module to an instrument panel, dash panel or the like. Another advantage of the present invention is that the mounting system allows mounting brackets to be easily, yet securely, positioned in different locations on the vehicle module. This flexibility can provide for increased styling design options.

Other objects, features and advantages of the present invention will be readily appreciated as the same becomes better understood after reading the following description taken in conjunction with the accompanying drawings.

DESCRIPTION OF THE PREFERRED EMBODIMENT(S)

Figure 1:
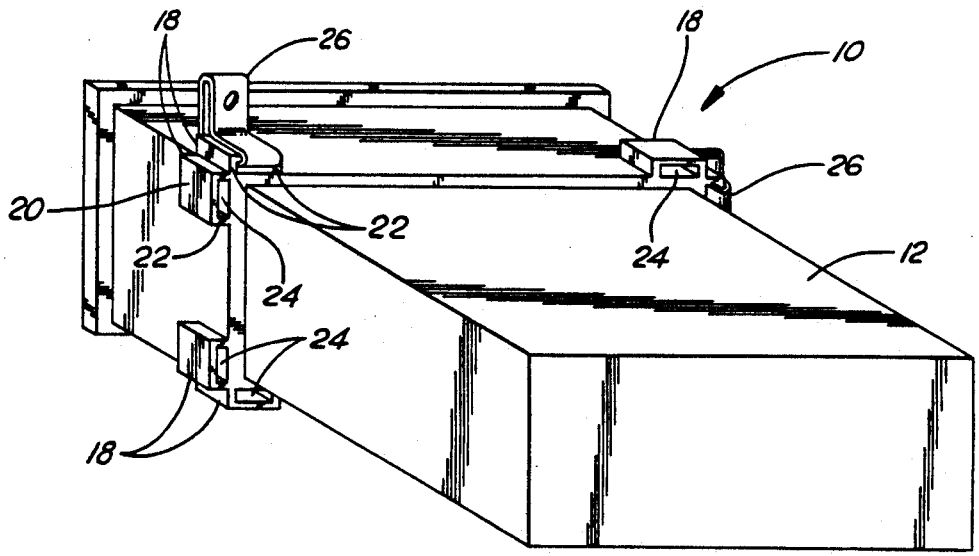
FIG. 1 is a rear perspective view of a mounting system, according to the present invention, illustrated in operational relationship to an electronic radio module.
Figure 2:
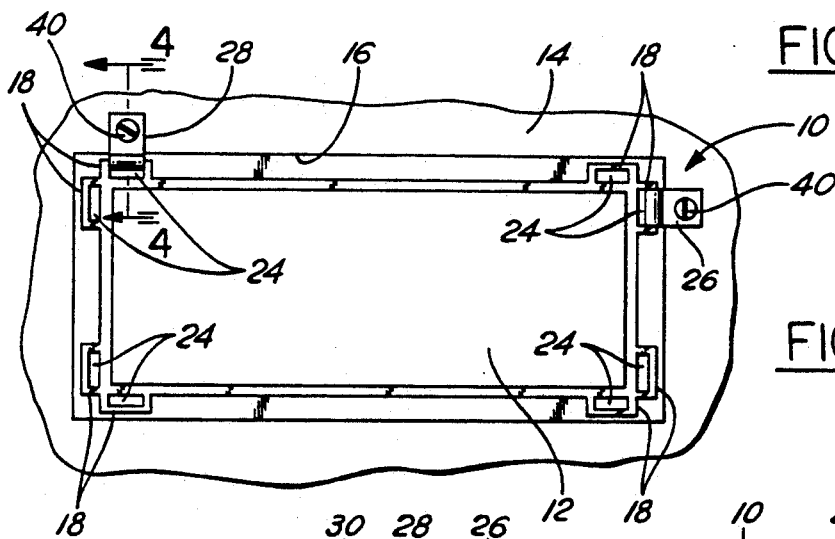
FIG. 2 is an elevational view of the mounting system and electronic radio module of FIG. 1 illustrated in operational relationship to vehicle structure.

Referring to the drawings and in particular FIGS. 1 and 2 thereof, a mounting system 10, according to the present invention is illustrated in operational relationship with an electronic radio module 12 and vehicle structure 14 such as an instrument panel, dash panel or the like of a vehicle (not shown) such as an automotive vehicle panel. The mounting system 10 is used to attach or mount the electronic radio module 12 in a cavity 16 of the vehicle structure 14.

The mounting system 10 includes at least one, preferably a plurality of loop shaped mounting structures 18 disposed about a perimeter of the electronic radio module 12. The mounting structures 18 have a base wall 20 and side walls 22 extending longitudinally. Preferably, the mounting structures 18 are integral and formed as one-piece with the electronic radio module 12 to form a generally rectangular loop shaped structure having an aperture 24 extending longitudinally therethrough.

Figures 3, 4:
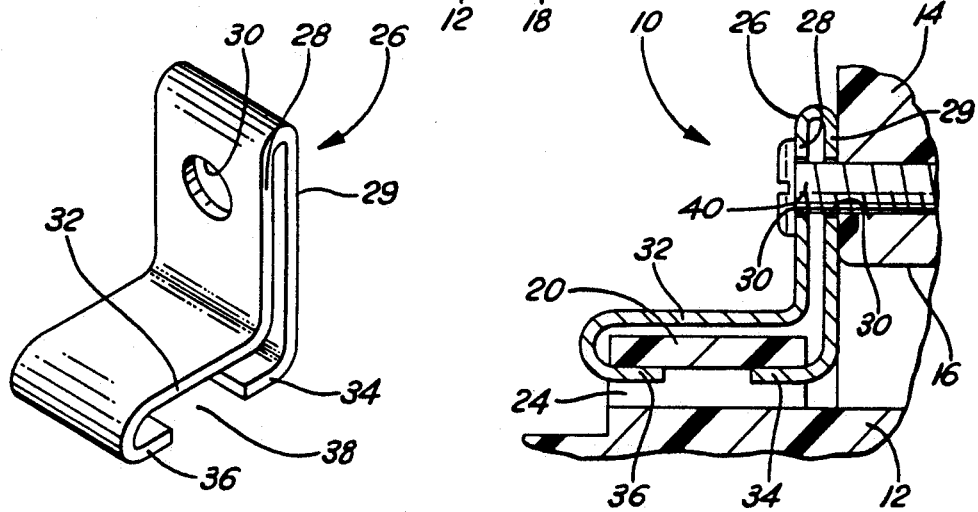
FIG. 3 is a perspective view of a bracket for the mounting system of FIGS. 1 and 2.
FIG. 4 is a sectional view taken along line 4—4 of FIG. 2.

The mounting system 10 also includes at least one, preferably a plurality of mounting brackets 26 to cooperate with the mounting structures 18. As illustrated in FIG. 3, each mounting bracket 26 has a pair of legs 28 and 29 forming a generally inverted U-shape and being spaced apart in a substantially parallel relationship. The legs 28 and 29 have an aperture 30 extending therethrough and aligned with each other for a function to be described. Each mounting bracket 26 also has upper and lower spaced flanges 32 and 34 extending from the legs 28 and 29, respectively. The upper flange 32 extends longitudinally farther than the lower flange 34. The upper flange 32 also has a generally "C" or hook-shaped secondary end flange 36 extending longitudinally to oppose the lower flange 34 and form a space 38 therebetween. The mounting brackets 26 are made of a flexible material such as spring steel or plastic. It should be appreciated that the mounting brackets 26 may have any suitable shape to form two hook shaped ends in a spaced apart relationship.

Referring to FIGS. 2 and 4, the mounting system 10 further includes at least one, preferably a plurality of fasteners 40 to removeably secure the mounting brackets 26 to the vehicle structure 14. The fasteners 40 are preferably screws which extend through the apertures 30 in the mounting brackets 26 and into the vehicle structure 14.

In operation, the mounting bracket 26 is expanded and placed over the mounting structure 18 such that the end flange 36 and lower flange 34 are aligned with the aperture 24 and released to return and dispose the flanges 34 and 36 in the aperture 24 between the base wall 20 and the electronic radio module 12. It should be appreciated that one flange 34, 36 may be disposed in the aperture 24 and the mounting bracket 26 expanded to place the other flange 34, 36 in the aperture 24.

Next, the fastener 40 is extended through the apertures 30 in the mounting bracket 26 and engages the vehicle structure 14. The fastener 40 is tightened to move the legs 28 and 29 together to hold the flanges 34, 36 in the aperture 24.

Accordingly, the mounting system 10 provides a secure, low cost and flexible method of mounting the electronic radio module 12 to the vehicle structure 14. The mounting structures 18 provide many choices of mounting locations for the mounting brackets 26.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A mounting system for mounting a vehicle module on vehicle structure, comprising:

at least one mounting structure attached to a perimeter of the module and having a longitudinal aperture extending therethrough;

at least one mounting bracket having a pair of hook shaped ends opposing one another in spaced apart relationship, said ends extending into said longitudinal aperture;

said at least one mounting bracket having a pair of legs forming a generally inverted U-shape and being spaced apart in a substantially parallel relationship, said hook shaped ends being disposed at a free end of said legs;

said at least one mounting bracket including means forming an aperture extending through said legs; and means for fastening said at least one mounting bracket to the vehicle structure comprising at least one fastener extending through said last mentioned aperture and engaging the vehicle structure.

2. A mounting system as set forth in claim 1 wherein said at least one mounting structure comprises a base wall and side walls forming a generally rectangular loop shaped structure extending longitudinally.

3. A mounting system as set forth in claim 2 wherein said at least one mounting structure is integral and formed as one-piece with the module.

4. A mounting system for mounting a vehicle module on vehicle structure, comprising:

at least one mounting structure integral and formed as one-piece with a perimeter of the module and having a longitudinal aperture extending therethrough;

at least one mounting bracket having a pair of legs forming a generally inverted U-shape and being spaced apart in parallel relationship and a pair of hook shaped ends disposed at a free end of said legs opposing one another in spaced apart relationship, said ends extending into said longitudinal aperture;

means for fastening said at least one mounting bracket to the vehicle structure;

said at least one mounting bracket including means forming an aperture through said legs; and said fastening means comprising at least one fastener extending through said last mentioned aperture and engaging the vehicle structure.

5. A mounting system as set forth in claim 4 wherein said at least one mounting structure comprises a base wall and side walls forming a generally rectangular loop shaped structure extending longitudinally.

6. A mounting system for mounting a vehicle module, comprising:

a plurality of mounting structures integral and formed as one piece with a perimeter of the module, each of said mounting structures having a base wall and side walls forming a generally rectangular loop shaped structure extending longitudinally and having a longitudinal aperture extending therethrough;

a plurality of mounting brackets having a pair of legs forming a generally inverted U-shape and being spaced apart in parallel relationship and a pair of hook shaped ends at one end of said legs and opposing one another in spaced apart relationship, said ends extending into said longitudinal aperture, and means forming an aperture extending through said legs; and a plurality of fasteners for fastening mounting brackets to the vehicle structure, each of said fasteners extending through said aperture in a corresponding said mounting bracket and engaging the vehicle structure.

* * * * *